US008888010B2

(12) United States Patent
Fan et al.

(10) Patent No.: US 8,888,010 B2
(45) Date of Patent: *Nov. 18, 2014

(54) DETECTION OF SECURITY MARKS SIMULATING NATURAL DEFECTS FOR EMBEDDING INFORMATION IN DOCUMENTS

(75) Inventors: Zhigang Fan, Webster, NY (US); Reiner Eschbach, Webster, NY (US); Calvin John Marlett, LaCrescenta, CA (US); William A. Fuss, Rochester, NY (US); James R. Low, Rochester, NY (US); Shen-ge Wang, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 540 days.

This patent is subject to a terminal disclaimer.

(21) Appl. No.: 13/238,377

(22) Filed: Sep. 21, 2011

(65) Prior Publication Data

US 2012/0024953 A1 Feb. 2, 2012

Related U.S. Application Data

(62) Division of application No. 11/582,813, filed on Oct. 18, 2006, now Pat. No. 8,056,821.

(51) Int. Cl.
*G06K 19/06* (2006.01)
*B42D 15/00* (2006.01)

(52) U.S. Cl.
CPC ........ *B42D 15/0013* (2013.01); *B42D 2035/02* (2013.01); *B42D 2035/50* (2013.01)
USPC .......................................... 235/494; 235/487

(58) Field of Classification Search
USPC .................................................. 235/487, 494
See application file for complete search history.

(56) References Cited

U.S. PATENT DOCUMENTS 4,423,415 A * 12/1983 Goldman ..................... 340/5.86
5,337,361 A 8/1994 Wang
5,340,159 A 8/1994 Mowry, Jr.

(Continued)

FOREIGN PATENT DOCUMENTS

JP 10-011509 1/1998
JP 2003-209676 7/2003
JP 2008-093974 4/2008

OTHER PUBLICATIONS

Digital Watermarks: The Interaction of Digital Watermarking and Copyright Law—WebReference.com, http://www.webreference.com/content/watermarks/interaction.html (1998).

(Continued)

*Primary Examiner* — Kristy A Haupt
(74) *Attorney, Agent, or Firm* — Fay Sharpe LLP

(57) ABSTRACT

A system for generating a security mark includes a data reception component that receives information. A security mark generation component in communication with the data reception component generates at least one security mark configuration based at least in part upon the received information. The at least one security mark configuration includes at least one simulation mark which resembles a natural feature. An application component applies one configuration of the at least one security mark configurations to a recipient. The applied security mark configuration obeys at least one rule whereby the security mark is distinguishable from the natural feature which it resembles by a system for detection of security marks.

24 Claims, 5 Drawing Sheets

(56) References Cited

U.S. PATENT DOCUMENTS

| | | | | |
|---|---|---|---|---|
| 6,370,258 | B1 | 4/2002 | Uchida | |
| 6,580,820 | B1 * | 6/2003 | Fan | 382/135 |
| 6,694,042 | B2 | 2/2004 | Seder | |
| 6,820,807 | B1 | 11/2004 | Antognini | |
| 7,002,704 | B1 | 2/2006 | Fan | |
| 7,715,057 | B2 | 5/2010 | Fan | |
| 8,056,821 | B2 * | 11/2011 | Fan et al. | 235/494 |
| 2002/0002679 | A1 * | 1/2002 | Murakami et al. | 713/176 |
| 2003/0136837 | A1 | 7/2003 | Amon et al. | |
| 2004/0080777 | A1 * | 4/2004 | Smith | 358/1.14 |
| 2006/0061088 | A1 | 3/2006 | Harrington | |
| 2006/0076416 | A1 * | 4/2006 | Pettersson | 235/454 |
| 2006/0115110 | A1 | 6/2006 | Rodriguez | |
| 2006/0165255 | A1 | 7/2006 | Wang | |
| 2007/0080533 | A1 | 4/2007 | Bleikholm et al. | |
| 2007/0138283 | A1 | 6/2007 | Dymetman et al. | |
| 2007/0158434 | A1 | 7/2007 | Fan | |

OTHER PUBLICATIONS

Digital Watermarks: Conclusion—WebReference.com, http://www.webreference.com/content/watermarks/conclusion.html (1998).

J. Zhao, "Digital Watermarking is the Best way to protect Intellectual Property from Illicit copying", http://www.byte.com/art.9701/sec18.art1.htm Jan. 1997.

Watermarks: Secret Code for Protection, http://www.byte.com/art/9701/img/017ifa2.htm, Retrieved Dec. 15, 2005.

Digital Watermarking-Wikipedia, the free encyclopedia, http://en.wikipedia.org/wiki/Digital_watermarking , Retrieved Dec. 15, 2005.

Digital Watermark, http://www.webopeidia.com/TERM/D/digital_watermark.html, Retrieved Dec. 15, 2005.

D. Isenberg, Digital Watermarks: New tools for copyright owners and webmasters, http://www.webreference.com/content/watermarks/ Retrieved Dec. 15, 2005.

Digital watermarking and tracking, http://www.webreference.com/content/watermarks/tracking.html, Retrieved Dec. 15, 2005.

Digital Watermark, http://www.yourwindow.to/information-security/gl_digitalwatermark.htm, Retrieved Dec. 15, 2005.

H. Berghel, et al. "Digital Watermarking", http://www.acm.org/~hlb/publications/dig_wtr/dig_watr.html , Revision Jan. 2, 1997.

F. Perez-Gonzalez et al. "A tutorial on digital watermarking", http://64.233.161.104/search?q=cache:khnQ2y7zZSEJ:www.gts.tsc.uvigo.es/gpsc/publication , Retrieved Jun. 20, 2006.

Langfelder, et al. "A device and an algorithm for the separation of visible and near infrared signals in a monolithic silicon sensor", 2011, SPIE, vol. 7882, pp. 1-9.

* cited by examiner

DETECTION OF SECURITY MARKS SIMULATING NATURAL DEFECTS FOR EMBEDDING INFORMATION IN DOCUMENTS

This application claims the benefit, as a divisional application, of U.S. application Ser. No. 11/582,813, filed on Oct. 18, 2006 now U.S. pat. No. 8,056,821, the disclosure of which is incorporated herein in its entirety, by reference.

CROSS REFERENCE TO RELATED PATENTS AND APPLICATIONS

Cross-reference is made to the following co-pending applications, the disclosures of which are incorporated herein by reference in their entireties:

U.S. Pat. No. 7,715,057, issued May 11, 2010, entitled HIERARCHICAL MINIATURE SECURITY MARKS, by Zhigang Fan; and U.S. Pub. No. 20070158434, published Jul. 12, 2007, entitled COUNTERFEIT PREVENTION USING MINIATURE SECURITY MARKS, by Zhigang Fan.

BACKGROUND

The exemplary embodiment relates to the digital imaging arts. It finds particular application in conjunction with a method and apparatus for utilizing marks which simulate natural defects for embedding information in hard copy documents and may be used to distinguish authentic hardcopy documents from counterfeit documents.

Machine readable information in the form of watermarks, barcodes, and the like has been embedded into images on paper for a variety of applications, such as document identification and authenticity verification. The code is generally invisible or visually unobtrusive and may be decoded by a device which is capable of reading the information. Current counterfeit prevention systems are frequently based on the use of digital watermarks. Digital watermarking is a technique which allows a user to add information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains. However, such techniques, while suitable for digital documents, are often not sufficiently robust to allow detection of the marks in hardcopies, i.e., when the digital document is rendered in physical form.

There remains a need for alternative systems and methods to provide watermarking techniques for identification of images and/or documents, for uses such as prevention of counterfeiting.

INCORPORATION BY REFERENCE

The following references, the disclosures of which are incorporated herein by reference in their entireties, are mentioned:

U.S. Pat. No. 7,002,704, entitled METHOD AND APPARATUS FOR IMPLEMENTING ANTI-COUNTERFEITING MEASURES IN PERSONAL COMPUTER-BASED DIGITAL COLOR PRINTERS, by Zhigang Fan, discloses a system for rendering an electronic image representation associated with a software application program. The system includes a host processor programmed to execute the software application program, a temporary storage device associated with the host processor, a printer interfaced to the host processor, and a software program operative on the host processor for determining whether the electronic image representation is of a predetermined document type by examining at least a portion of the electronic image representation when stored in the temporary storage device during the course of printing the electronic image representation at the printer.

U.S. Pat. No. 6,694,042, entitled METHODS FOR DETERMINING CONTENTS OF MEDIA, by Seder, et al., discloses printing documents and other objects with machine readable indicia, such as steganographic digital watermarks or barcodes, for enabling document management functions. The indicia can be added as part of the printing process, such as by printer driver software, by a Postscript engine in a printer. The indicia can encode data about the document, or can encode an identifier that references a database record containing such data. By showing the printed document to a computer device with a suitable optical input device (e.g., a webcam), an electronic version of the document can be recalled for editing, or other responsive action can be taken.

Published Application No. 20060165255, entitled EMBEDDING VARIABLE WATERMARK INFORMATION IN HALFTONE SCREENS, by Wang, et al., discloses incorporating correlated stochastic screens, time stamps, text messages, logos and other variable data into printed halftone images in real-time as invisible watermarks.

Published Application No. 20060061088, entitled METHOD AND APPARATUS FOR INTERNET COUPON FRAUD DETERRENCE, by Harrington, et al., discloses embedding anti-counterfeiting marks that carry user information and other data into an original coupon design. The marks may be invisible, or visible but difficult to remove. At the receiving sides of the coupons, the embedded data are used to detect fraud and trace back the coupon users.

U.S. Pub. No. 20070158434 discloses a system which applies a security mark to a recipient, such as an image or document. A data reception component receives information from one or more sources. A security mark generation component generates at least one miniature security mark (MSM) configuration based at least in part upon the information from the data reception component. An application component applies the at least one MSM configuration to one or more recipients.

BRIEF DESCRIPTION

In one aspect of the exemplary embodiment disclosed herein, a system for generating a security mark includes a data reception component that receives information, a security mark generation component in communication with the data reception component that generates at least one security mark configuration based at least in part upon the received information, the at least one security mark configuration comprising at least one simulation mark which resembles a natural feature and an application component that applies one configuration of the at least one security mark configurations to a recipient, the applied security mark configuration obeying at least one rule.

In another aspect, a method for applying a security mark to a recipient includes generating at least one security mark configuration representative of information to be applied to a recipient, the at least one security mark configuration comprising at least one simulation mark which resembles a natural feature and applying one configuration of the at least one security mark configurations to a recipient the applied security mark configuration obeying at least one rule whereby the security mark is distinguishable from the natural feature which it resembles by a system for detection of security marks.

In another aspect, a recipient includes an image and a machine readable security mark embedded therein, the security mark comprising at least one simulation mark which resembles a natural feature, the at least one simulation mark obeying at least one predefined rule whereby the security mark is distinguishable from the natural feature which it resembles.

In another aspect, a method for detecting a security mark includes inputting image data, processing at least a portion of the image data to identify at least one mark which potentially forms at least a part of a security mark resembling a natural feature, subjecting the image data to a predetermined set of rules for the security mark including at least one rule whereby the security mark is distinguishable from the natural feature which it resembles, and where the image data meets the predetermined set of rules, implementing a computer implemented process.

In another aspect, a system for detection of security marks includes a detection component for generating a signal representative of image data and an extraction component for extracting from the image data a security mark where present. The security mark includes at least one simulation mark resembling a natural feature. An interpretation component is provided for interpreting the extracted security mark. Optionally, an implementation component is provided for implementing a computer implemented process in accordance with the interpretation.

DETAILED DESCRIPTION

Figure 1:
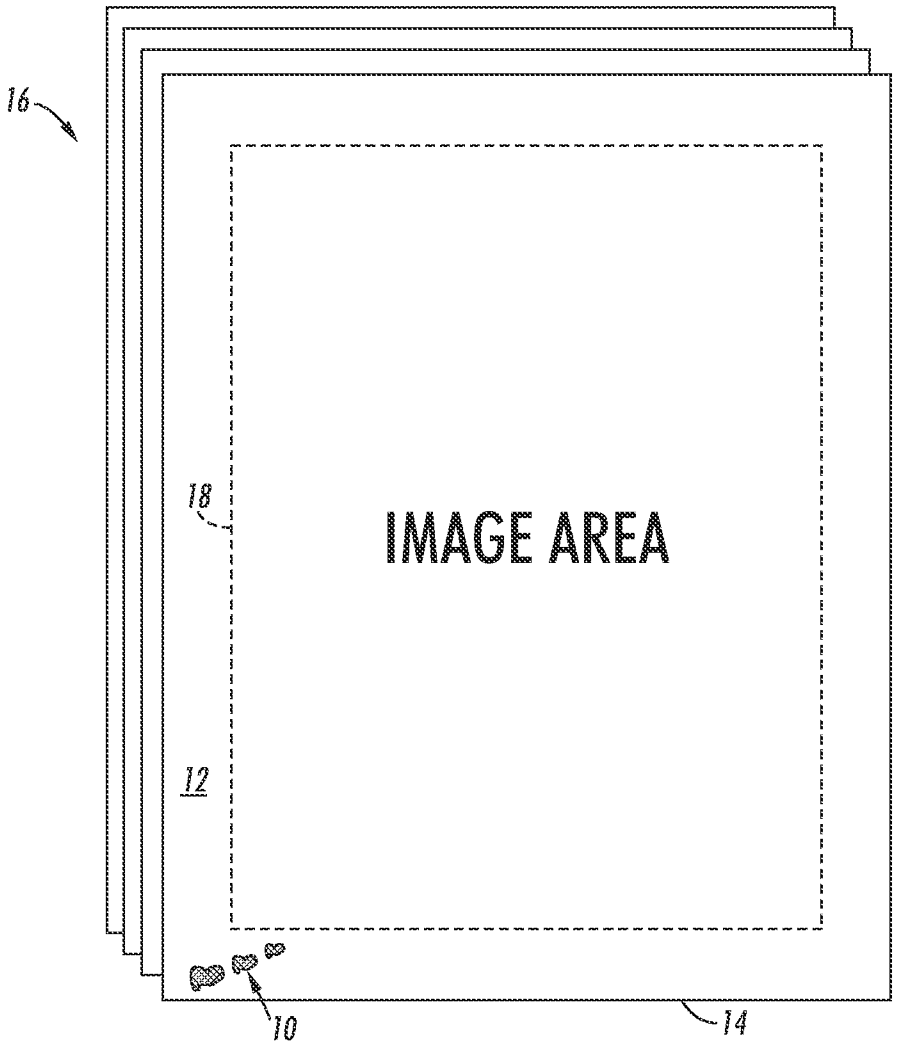
FIG. 1 is a top plan view of a document incorporating a security mark in accordance with the exemplary embodiment (not to scale)

U.S Pub. No. 20070158434, incorporated by reference, discloses a system which applies a miniature security mark (MSM) to a recipient, such as a digital image or a rendered image. The MSM is a collection of small, virtually invisible marks having a particular configuration. Such marks have an advantage in that they can be embedded in paper documents that are to be protected (e.g., passports) and detected with relatively simple detection techniques. Such detection techniques are thus amenable to use with printing systems with little associated processing capability, such as printers designed specifically for printing camera images by a simple link to the camera or memory card, without requiring access to a stand alone personal computer.

The detection rate of these miniature security marks (MSM's) tends to increase as the number of marks in the collection increases. Where only a limited number of marks is used, false alarm rates tend to increase. For example, 10-15 marks may be used for accurate detection. Additionally, if the marks making up the MSM are placed too close together, they may become visible to the naked eye, which may be undesirable for some applications. These two factors can thus place a constraint on the minimum area occupied by the MSM. Moreover, if the marks comprising the MSM are too close to an edge of the host image, the edge may interfere with detection. The techniques described in U.S. Pub. No. 20070158434 are particularly suited to use in fairly large, smooth (low contrast) regions of an image.

In the present exemplary embodiment, a security mark comprises one or more marks which resemble natural features of printed documents (hereinafter "simulation marks"). By "resemble" it is meant that the simulation marks, absent magnification, are indistinguishable, to the human eye of the casual observer, from the natural features which they resemble. The features resembled may be natural defects frequently observed in printed documents, such as liquid stains, dust particles, ink spots, printer defects, fingerprints, and paper features, such as paper fibers. While resembling natural features, the exemplary simulation marks are not natural features in that they do not arise from random placement or by accident. Rather, while simulating natural marks in their size, shape, and/or color, the simulation marks have specific parameters, such as one or more of location, orientation, relative position with respect to other such marks, and in some cases, their size, color, and/or shape, which allows them to be distinguished with an acceptable level of confidence from naturally occurring features by suitable processing software. A higher confidence level can be achieved by applying more features and with feature parameters that are less likely to appear in the natural defects which they resemble. An acceptable confidence level may be, for example, at least 90% (90% of security marks are detected and identified as such and/or less than 10% of marks detected as security marks are actually natural defects). In another embodiment, an acceptable confidence level may be higher, such as 95% or 98%, or more. To the unaided eye, however, the exemplary simulation marks may be invisible or visible. Where visible, they are viewed by observers as being naturally occurring features and are generally not noticed. Accordingly, they do not generally raise the suspicion of being a security mark. Simulation marks resembling those naturally occurring features which are often found outside the normal printed area (predefined image area) of a page may thus be placed in such locations without arousing suspicion. This allows the simulation marks to be placed in those areas which are normally left blank and which can therefore provide a good contrast with the simulation marks for ease of detection. Such simulation marks are also robust to printing since the printed images restricted to the normal printable area do not interfere with detection of the simulation marks.

In one embodiment, the location of one or more simulation marks in combination with one or more of size, shape, and color, of the one or more simulation marks is used to identify the simulation marks as security marks and optionally to provide information. Where the security mark includes two or more simulation marks resembling natural features, the simulation marks may all resemble the same natural feature or a first of the simulation marks may resemble a first natural feature, such as a coffee stain, while a second simulation mark resembles a second natural feature, such as a paper fiber.

In general a security mark may comprise a single simulation mark or a collection which includes several simulation marks.

U.S. Pat. No. 7,715,057 discloses a collection of marks forming an MSM which has a hierarchical structure (a "hierarchical miniature security mark" or HMSM), in which the collection comprises groups of marks whose relative positions and orientations are specified by a set of rules. A hierarchical MSM (an HMSM) is an MSM in which groups of marks obey a predetermined set of rules governing relationships between groups in the collection. The exemplary security mark may comprise an HMSM as described in U.S. Pat. No. 7,715,057 in that a collection of simulation marks obey such rules. Such an embodiment allows high accuracy in detection of the HMSM, even when the HMSM includes a relatively few marks or is located in or adjacent to a relatively high contrast area of an image, such as an edge or a visible character. For example, a group of simulation marks in the HMSM may be spaced from a second group of the simulation marks by a visible character or portion thereof which does not form a part of the HMSM. The rules specifying the intergroup relationships allow the two groups to be identified as part of the HMSM.

The security mark is detectable with a certain confidence level, when rendered, for example, in printed media, by at least one parameter of the simulation mark or marks comprising the security mark and distinguishable from naturally occurring features of the type resembled by the simulation mark(s). In the case of a security mark comprising a plurality of simulation marks, the simulation marks may have a configuration which obeys a predetermined rule or set of rules for set of such marks. In the case of an HMSM, a hierarchical security mark comprising a collection of simulation marks, obeys a set of rules including at least one rule which defines a relationship between first and second groups of simulation marks.

In various aspects, a system for generating a security mark includes a data reception component which receives information to be represented in the form of a security mark. A security mark generation component generates at least one security mark configuration based at least in part upon the information from the data reception component. An application component applies the at least one security mark to one or more recipients. The security mark generation component may access an algorithm look up table, or the like to identify a security mark which is to be used for conveying the information. The security mark generation component may select from a plurality of security marks or configurations of security marks, a security mark or configuration which meets predetermined selection criteria. In one embodiment, the criteria may be defined to output a suitable configuration which can be incorporated into an image such that the security mark as a whole, or each group of simulation marks, is located in a region which provides sufficient contrast for the simulation marks in the security mark or group to be subsequently detectable. The region may be around the periphery of an image where printing is normally prevented.

In other aspects, a method for generating a security mark includes applying a mark or a collection of marks to a recipient, at least one of the marks being a simulation mark resembling a natural feature.

In another aspect, a system for detection of security marks includes means for extracting a security mark as described herein from a recipient in which it has been embedded and interpreting the mark and optionally for implementing a computer implemented process based on the interpretation.

In another aspect of the exemplary embodiment, a method for detecting a security mark includes inputting image data, processing at least a portion of the image data to identify a mark or collection of marks which potentially comprises a security mark, subjecting the image data to a predetermined set of rules for the security mark including at least one rule which defines a location, orientation, shape, size, and/or color of the one or more simulation marks and/or a relationship between first and second simulation marks and/or groups of simulation marks, and, where the image data meets the predetermined set of rules, optionally implementing a computer implemented process.

In yet another aspect, a computer readable medium includes instructions, which, when executed on a processor, causes the processor to perform the exemplary embedding and/or detection method.

The inputting of image data may include inputting stored image data from an image data file or scanning a physical document to generate the image data for an image rendered on the document.

Security marks are considered to be machine readable if techniques are available for automatically obtaining information from signals that include information about the marks. Security marks are considered to be visible if humans generally perceive the marks with an unaided eye.

A security mark, as used herein can be any mark (e.g., depression, impression, raised, overlay, combination thereof, or the like) that is applied to a recipient. The recipient may be a physical document formed on a physical medium and may include a digital image, such as a graphic, a picture, a body of text, or a combination thereof. The physical document can be formed by marking the physical medium, such as a physical sheet of paper, plastic, velum, glass, or other suitable physical print media substrate for images, with a marking material, such as ink or toner, generally referred to as printing. The security mark may be applied in the same or a different process from that used to form an image. The document may be rendered on a single sheet or multiple sheets by a printer, such as a standard office printer or copier (e.g., ink-jet, laser, etc.) or a large clustered on-demand document printer. In general, a physical recipient can comprise any material upon which a security mark can be placed and subsequently detected and extracted.

In one embodiment, a security mark comprises a collection of simulation marks which obey a predetermined set of rules governing relationships between marks or groups of marks in the collection. The simulation marks in the collection may be miniature marks, i.e., marks of a size which while being capable of being machine readable, are too small to be visible. Or, the simulation marks, or selected ones thereof, may be visible and resemble visible defects.

For example, in the case of simulation marks which are not visible, the individual simulation marks in the collection may have a size of between about 1 micrometer and several hundred micrometers, generally less than 200 micrometers, and sufficiently spaced from each other such that they are virtually invisible to the naked eye. In the case of visible marks, the size and shape may be similar to the defects or other natural features which they resemble.

In the case of simulation marks resembling fibers, for example, the size, shape, and color of the simulation marks may be similar to the size shape and color of fibers used in the physical document. For example, the document may comprise natural fibers, such as wood, cotton (rag), jute, flax, hemp and/or other naturally occurring cellulose fibers, and the marks may have a similar color, shape, and size to such fibers. Typically, even in white paper, there are some fibers which are of a somewhat different color from other fibers (e.g., as a result of inadequate bleaching or by incorporation of a different type of fiber. The simulation fibers may resemble such fibers. Thus, although they may stand out from the surrounding fibers, the simulation fibers are regarded as being simply a natural fiber defect. The ratio of the length: width of the simulation marks resembling fibers may be similar to that of fibers, for example, at least 4:1, and in one embodiment, at least 10:1. The fiber simulation marks may be non linear, e.g., curved. In a security mark comprising a set of marks, the simulation marks resembling fibers may all have the same curvature or different curvatures. In general, natural fibers in a document show a statistical variation in length. The simulation marks in the security mark may all have the same length or exhibit a non-statistical length variation (e.g., all simulation marks may have a dimension, e.g., length which is a factor of the dimension of another mark in the security mark).

In the case of simulation marks which resemble stains, such as coffee stains, the security mark may be generally circular or have the appearance of being deposited from a moving coffee cup. Several such simulated marks may be arranged in the same general direction to simulate a trail of coffee drips. The marks may be brown, ranging from dark brown to cream colored. In general, the marks may be of a sufficient size that they are visible, such as from about 400 micrometers to about 2 mm or more. A specific arrangement, relationship between marks, or other suitable rule allows the security mark to be distinguished from a real coffee stain with a certain probability. While other stains may be simulated, they are less common in practice and thus more likely to alert suspicion or close examination.

In the case of simulation marks which resemble printer defects, such as flaws in a typeface such as a missing or truncated serif or a "cut" through, or partially through, the character, or filled, or partially filled in, characters such as a filled in small letter "e", the security mark can be introduced into the text and/or the background of a text-containing document. Several such marks i.e., the presence or absence of those marks, may be used in a document to encode a binary message. For very long documents the "message" can be repeated over and over throughout the document. A specific arrangement or relationship between marks, or other suitable rule allows the security mark to be distinguished from malformed characters.

By showing a printed document to a computer device with a suitable associated optical input device, the machine-readable information provided by the security mark is decoded, and can be used to invoke a computer-implemented process. The computer-implemented process may be any suitable process which is implemented automatically as a result of the detection of a security mark or the detection of an absence of a security mark. For example, the computer implemented process may include permitting/prohibiting copying of the recipient in which the security mark is detected/not detected, alerting a user by a signal, such as a visible or audible signal, that a recipient can/cannot be copied or advising the user of some other action which should be taken, preventing removal/destruction or otherwise preventing access to the recipient or reuse of the recipient in which the security mark was detected/not detected, or other computer implemented processes.

In some cases, verification of authenticity of the one or more products is of interest to a user. In order to provide a means to verify authenticity, one or more security marks can be placed on the product. Such security marks can be detected and extracted at a later time for verification purposes. For example, the security mark can contain information that can be detected, extracted and/or interpreted. Such information can be employed, for example, to prevent counterfeiting by verifying that the information contained within the security mark is accurate. The information can be used to verify the authenticity of the recipient to which the security mark is applied. The information may be contained in the mark by virtue of the configuration of the marks or other feature(s) of the marks in the collection which may be associated, e.g., in memory, with particular information from which the security mark is derived.

The simulation mark or marks generally serve two purposes: (1) identification of the collection of marks as a security mark, and (2) providing information, such as information about the recipient which the security mark protects. In one embodiment, all of the simulation marks in the security mark are used for both purposes. In other embodiments, selected one(s) of the marks are used for only one of the purposes. In yet further embodiments, specific aspects of the marks and/or their configuration are used for one or both of these purposes.

In the exemplary embodiment, spatial relationships of simulation marks may be defined by a first set of rules which permit different configurations. The configurations may include configurations in which the simulation marks are arranged generally along the same axis and configurations in which two or more simulation marks are aligned generally with a second axis spaced from the first axis (such as in a triangle, square, rectangle, diamond, or other polygonal arrangement). In some configurations, some simulation marks may be spaced from other simulation marks by different spacings. In the case of an HMSM, a second set of rules may similarly define relationships between groups of simulation marks. The second set of rules thus may accommodate different configurations which permit one or more groups to be spaced from another group or groups by a part of the image.

For example, the spacing (distance) between proximate simulation marks may be expressed as a function of a fixed distance, such as kn where k is a variable multiplier and may be an integer which can assume any value between maximum and minimum values and n may be a fixed number of pixels, such as 10, 20, or 50 pixels. The spacing may be defined in mutually perpendicular directions (x and y), such as cross process and process directions in an image to be printed.

Figure 2:
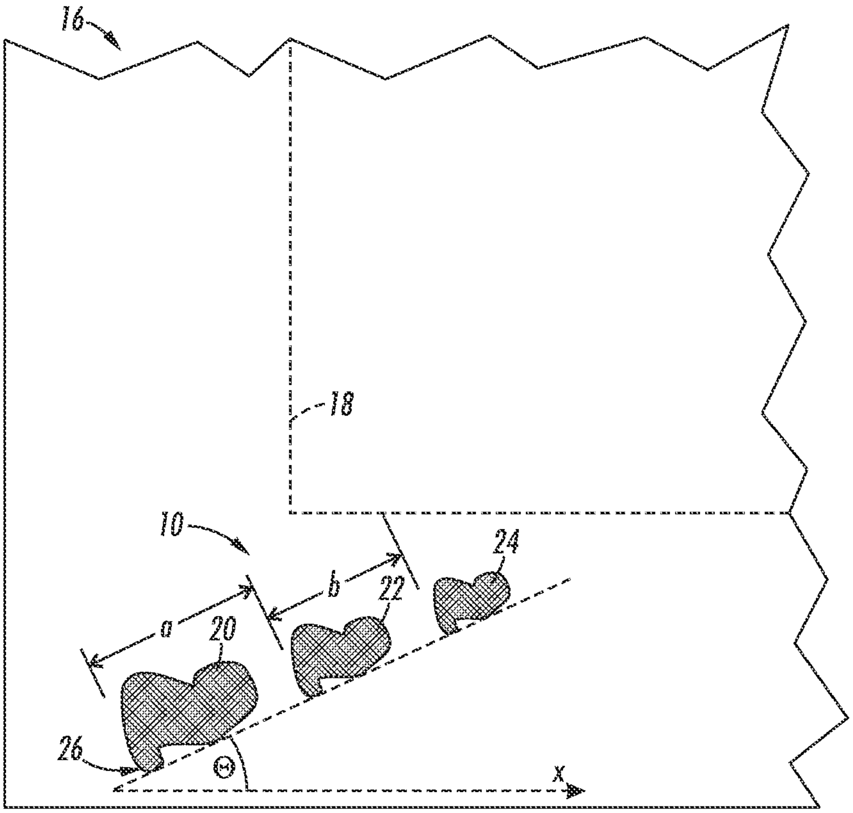
FIG. 2 is a greatly enlarged top view of a security mark of FIG. 1.

The first set of rules may specify an orientation of the marks which form the group of marks. For example, first and second marks may be oriented at a predefined angle a to a third mark or all marks may be arranged in the same direction (FIG. 2). The first set of rules may define the relative positions of marks. For example, a distance between the first simulation mark and the third simulation mark of the security mark may be equal to (or some other fixed relationship to) a distance between the second simulation mark and the third simulation mark or between second and fourth marks. Other rules may specify other features of the marks, such as minimum and/or maximum number of simulation marks in a security mark or a fixed number of such marks; a minimum and/or maximum size of simulation marks in the security mark or a fixed size; an attribute of the marks, e.g., a color (or gray level) or size of one or more simulation marks in the security mark or a fixed attribute for all marks in the group.

The number of simulation marks which a security mark may contain can depend on the nature of the simulation mark and the typical number of natural defect marks in a document which would normally occur. For example, in some embodiments, there may be at least two simulation marks and in some embodiments, up to a hundred simulation marks, or more. For example, in the case of coffee stains, there may be from one to ten simulation marks, such as two, three, four or more marks. In the case of fibers, more simulation marks may be provided, particularly when the simulation marks are barely noticeable or unnoticeable to the naked eye.

In detection, to identify a security mark, potential simulation marks are identified. Additionally, the relative positions and orientations of the simulation marks may be determined to establish whether rules specified are established.

With reference to FIG. 1, an exemplary security mark 10 in the form of a simulated coffee stain is illustrated. The illustrated security mark 10 is located in an area 12 of a printed page 14 of a physical document 16 which is determined to be of an acceptable level of image smoothness for detection of the security mark. In the illustrated embodiment, the area 12 is outside the normal image area 18 of the page. Alternatively, the security mark 10 may be embedded in the image area 18. The illustrated document can be, for example, a title, a license, a visa, a passport, a bill of currency, a check, or the like. In addition, although a single security mark 10 is illustrated, a plurality of security marks can be applied in substantially any location on the recipient, such as paper.

The illustrated security mark 10 includes a group of three simulation marks 20, 22, 24, shown in enlarged detail in FIG. 2. The illustrated marks have the same color and are arranged in the same orientation, (at an angle θ to the process or cross process direction) and are spaced apart by distances a and b which are predefined. Additionally, each of the simulation marks has a unique feature in common- a small indent 26 in the lower left corner of each simulation mark. As will be appreciated, the rules defining the marks 20, 22, 24 and their relationships are not limited to those shown, but are merely illustrative.

Figure 3:
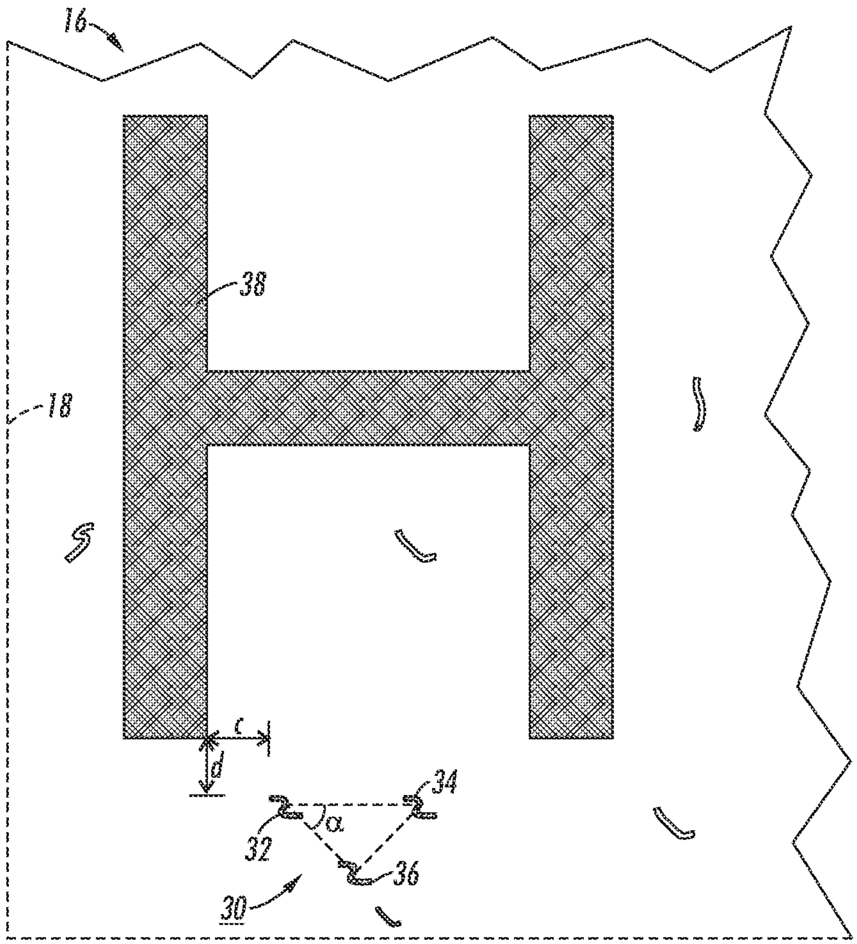
FIG. 3 is a greatly enlarged illustration of another exemplary security mark proximate a visible character.

Another exemplary security mark 30 is illustrated in FIG. 3. The mark 30 comprises simulation fibers 32, 34, 36. The illustrated simulation fibers are spaced apart by predefined distances in the shape of a triangle, in which the second and third marks 34, 36, define an angle a with the first mark 32. All the marks are the same size, shape and color. The security mark 30 is positioned proximate a character 38 in the image (here the letter H). The distance to the security mark 30 from the character 38 may be defined such as by a distance c in the process direction and a distance d in the cross process direction.

It will be appreciated that rules for detection of the security mark may specify latitude limits within which the rules defining the simulation marks and relationships between them are considered to be obeyed. For example, a rule which specifies:

Distance c=30 (pixels)

may be considered to be satisfied, for example, where the detected distance c=30 (pixels)±δ where δ can be, for example, no more than 5 pixels. The value of the latitude limit δ selected may depend on the capabilities of the detection system and on the degree of tolerance for false positives, as well as the accuracy of the rendering device and/or the smoothness of the substrate on which the security mark is rendered. A mark or a collection of marks which simultaneously satisfies all the preselected rules for a given security mark (i.e., within the predefined latitude limits) is recognized as an acceptable configuration of the security mark.

Some of the marks in the security mark may be anchor marks, as described in U.S. Pub. No. 20070158434. However, as each group is relatively small, the anchor marks, which enable a reduction in the overall computation, are not generally necessary. The anchor marks, where present, may provide two reference points for the security mark configuration. Such reference points allow data to be extracted regardless of the scale, orientation, or the like of the security mark. The anchor marks may have a different size, shape, color, or other distinguishable feature from the simulation marks. In particular, the anchor marks within a security mark have at least one attribute (e.g., size, shape, color, etc.) that is different from the simulation mark(s) in the group. In general, no anchor mark can have all the same attributes of any simulation mark.

The simulation marks in the security mark can be used, collectively or individually, to represent information. For example, one or more of the location(s), size(s), color(s) and/or shape(s) of the one or more simulation marks and/or their inter/intra group spatial relationships can designate the information contained therein. In this manner, information can be stored in and extracted from a security mark configuration utilizing one or more algorithms. For example, the algorithms may comprise processing instructions which compare one or more of the location(s), size(s), color(s), shape(s) of the one or more simulation marks and/or their inter/intra group spatial relationships and/or number of groups embedded in a recipient with those of one or more stored values for security marks which are associated in memory with one or more stored parameters. The stored parameters may enable authentication of a document, e.g. by providing information identifying the document in which the security mark is intended to be embedded, e.g.: a passport or other travel document issued in a particular year or from a particular issuing office; or identify the owner or source of the document. The stored parameters may identify whether the document may be copied, e.g., by identifying the document as a copyrighted document or a security document in which copying is limited in some way. Additional groups of marks may be provided to increase the amount of information. For example, all currency denominations may have a security mark as exemplified in FIGS. 1 to 3. An additional simulation mark may be added to the three simulation marks for denominations above a certain value.

Figure 4:
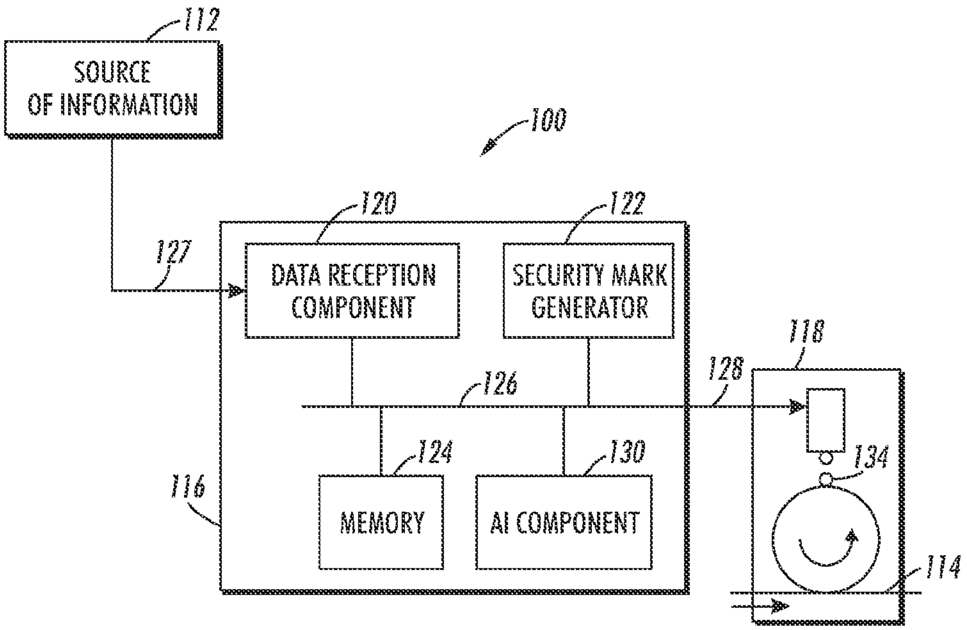
FIG. 4 is a functional block diagram of an exemplary embodiment of a system that applies a security mark to a recipient.

With reference to FIG. 4, an exemplary system 100 for generating and applying security marks to one or more recipients is illustrated. The illustrated system 100 includes a source of information 112 which supplies information to be embedded in a recipient 114 to a generating component 116, which generates a security mark in accordance with the information, and an application component 118, in communication with the security mark generation component, for embedding the generated security mark in an image to be applied to the recipient 114. The illustrated generating component 116 includes a data reception component 120, which receives the input information, a processing component 122, which executes instructions for generating a security mark based on the received information, and a memory 124 which stores the processing instructions, all interconnected by a data/control bus 126. It will be appreciated that two or more of these components may be combined or distributes as two or more separate components. For example, memory 124 may be combined with processor 122 as a single chip. Memory 124 may include data reception component 120. The generating component 116 may be any suitable computing device for processing and storing data, such as a general purpose computer or combination processor and memory device. In one embodiment, the generating component 116 may form a part of a dedicated device, such as a printer 118.

The data reception component 120 can comprise memory for storing the information received from the source of information and may also store a set of rules for the security mark which are developed by the processor based on the information. The memory may represent any type of computer readable medium which incorporates alterable memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. The data reception component 120 receives information data from one or more sources 112. Such sources can be one or more databases, processing components, etc. that contain information related to one or more products (e.g., currency, passports, visas, banking documents, identification documents, etc.), generally in machine readable form. Data received by the reception component 120 can be representative of substantially any desired quantity or quality such as origin of manufacture, date, time, serial number, currency value, combination thereof or simply an arbitrary alphanumeric string. In one embodiment, the data is proprietary and may be encoded such that only a limited number of users can interpret the data. Such information can be utilized to verify the authenticity of the recipient to which the security mark is applied.

The processing component 122 can be any suitable processing component which can convert received data into at least one security mark which is placed in a particular configuration. Suitable processing components are instantiated in general purpose computers or dedicated devices. Information from the data reception component 120 can be employed to generate one or more security marks. The marks that comprise a security mark or a configuration thereof can be composed via one or more algorithms stored in memory 124 that convert the received data to a set of rules governing permitted configurations of marks that are representative of the received data. Additionally, the processor may derive a set of permitted configurations which obey the rules. The algorithm can utilize one or more equations, methodologies, work flows, or the like to determine one or more of the locations, sizes and shapes of one or more simulation marks in the security mark. Such a determination can be made based at least in part upon one or more aspects of one or more disparate marks.

The algorithms can employ substantially any method to determine the location, size, shape, etc. of the marks within a prospective security mark or acceptable configuration. For example, key dependency, mathematical morphology, etc. can be employed.

The memory component 124 can store one or more algorithms, look up tables, or the like for generating a particular security mark or configuration thereof. New algorithms to be employed by the security mark generation component 116 can be transmitted to the memory component 124. In this manner, algorithms can be stored, viewed, edited, organized and retrieved for subsequent use. Selection of an algorithm can be based on a plurality of factors such as data source, user preference, time constraints, footprint constraints, data constraints, surface type, and the like.

The memory 124 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The source of information 112, generator 116, and application component 118 may be interconnected by links 127, 128 for communication therebetween. Suitable links include one or more of wired and wireless links, internet or intranet connections, or the like.

In order to determine an appropriate security mark generation algorithm, an artificial intelligence (AI) component 130 can be employed to select one or more appropriate algorithms from a set of available algorithms. In one aspect, the AI component 130 can employ information received from one or more sources (e.g., databases, processors, machine control systems, etc.) to determine an appropriate algorithm. In another aspect, one or more parameters can be detected and employed to determine an appropriate algorithm. In one exemplary embodiment, the appropriate algorithm can be determined by machine learning wherein one or more training sets of data with examples of desired results and/or undesired results for data format and/or processing techniques can be utilized to train the system. In another aspect, initial conditions, based on one or more features that indicate desired results, can be utilized. Such initial conditions can be adjusted over time and associated with returned results in order to improve discrimination. In one embodiment, where the simulation marks are fibers, the AI component 130 determines the statistical variations in naturally occurring fibers in the recipient to be printed and outputs suitable fiber sizes/shapes to be simulated.

The processor 116 may select one of the permitted security mark configurations, based on the image to which is to be embedded. For example, the processor may apply one or more criteria to select a configuration which is machine-readable and yet which is visually unobtrusive or indistinguishable to the naked eye, from the naturally occurring features in the recipient in which it is to be embedded.

The application component 118 can apply one or more security marks received from the security mark generation component 112 to one or more recipients. The application component 118 may include a printer or other device capable of rendering an image in a tangible medium or an electronic medium. In one example, the application component 118 is embodied in a printer that can place a security mark configuration on a physical recipient 114 (e.g., paper, velum, acetate, etc.) based at least in part upon commands received from the security mark generation component 116. In this manner, a mark applying component 132, such as a print head, ink jet, an applicator, photoconductive element of a xerographic device, or the like can and distribute a marking medium 134, such as ink or toner, in specified locations to create a particular MSM configuration. The mark applying component 132 may move to one or more locations relative to the recipient 122 during application of the security mark. In another embodiment, the application component 116 comprises a laser marking system that removes and/or discolors a surface of the recipient in order to create a particular security mark configuration. The security mark applying component 116 can be embodied in a conventional printer, such as an inkjet or xerographic printer which includes an image applying component which applies the security mark as part of an image to be protected by the security mark. In general, a printer can comprise any device for rendering an image on print media, such as a copier, laser printer, bookmaking machine, facsimile machine, or a multifunction machine.

While particular reference is made to applying a security mark to a physical embodiment of a recipient, it is to be appreciated that the mark applying component 116 may apply the security mark to a digital image by embedding the security mark as data in the image data. For example, the image data can be transformed by changing gray levels corresponding to colorant values of pixels of the image. It is to be appreciated that the application component 116 can be substantially any device that can create one or more marks on a recipient.

Figure 5:
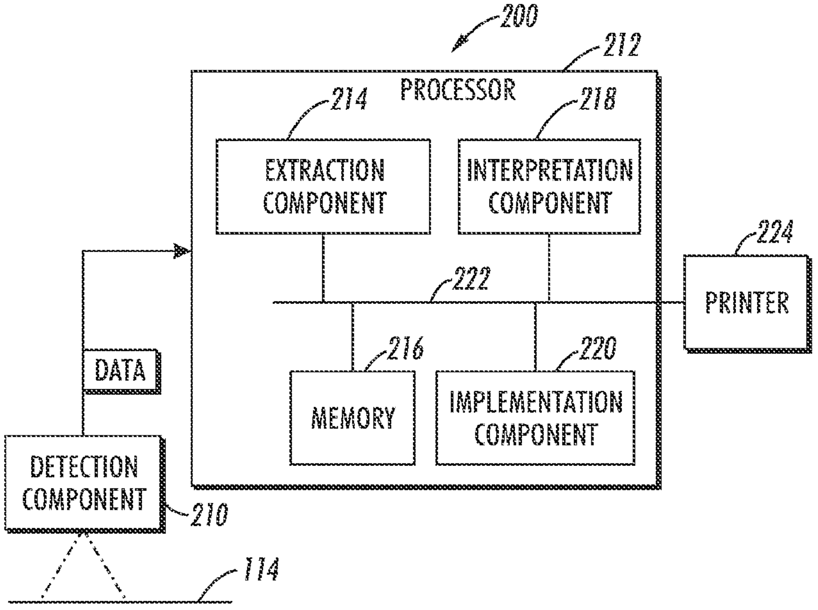
FIG. 5 is a functional block diagram of an exemplary embodiment of a system that detects, extracts and interprets data contained within a security mark.

FIG. 5 illustrates a system 200 that retrieves a security mark from a recipient, associates information with the security mark (i.e., interprets it), and may also invoke a computer implemented process based on the interpretation. The illustrated system 200 includes a detection component 210, and a processor 212 comprising an extraction component 214, a memory 216, which stores one or more algorithms, an interpretation component 218, and optionally an implementation component 220 which implements a process based on information from the interpretation component 218. The processing components 214, 218, and 220 and memory may be connected by a data/control bus 222. The processor 212 may comprise a general purpose computer or may form a part of a dedicated device for implementing a specific computer implemented process, such as a banknote verification device, passport verification device, printer, or the like. The exemplary system 200 can detect one or more security marks that are applied to a recipient, extract the one or more security marks, and interpret the data contained within the one or more security marks, and optionally implement a process based on the interpretation. The memory 216 can store one or more algorithms utilized by the extraction component to extract the one or more security marks applied to the recipient and/or by the interpretation component for interpreting the extracted mark.

The detection component 210 can be employed to detect one or more security marks located on a recipient. A suitable detection component 210 may include an optical input device capable of capturing information from an entire document or from a localized region of a recipient, such as a part of a document, and generating a signal representative of the captured region, such as colors or gray levels for pixels in the region. The detection component 210 may include a processing component which executes processing instructions for evaluating the signals. For example, the detection component may be preprogrammed such that it searches for particular configurations, specific locations, after a predetermined condition is met, and so forth. In this manner, the detection component 210 can be customized based on one or more user requirements. The detection component 210 can be substantially any device that can scan a recipient surface and locate one or more putative security marks or configurations thereof.

In one embodiment, the detection component 210 comprises an optical detection system that can scan a particular field utilizing a charge coupled device (CCD) array. The optical detection system may select a region of an image for analysis where a security mark is expected to be located, e.g., the optical detection system may zoom in on the surface of a bill of currency and detect the location of one or more security marks and the data contained therein.

The extraction component 214 can employ one or more algorithms to extract information contained within one or more security marks. Algorithms can contain one or more formulae, equations, methods, etc. to interpret data represented by a particular security mark. One or more predetermined thresholds can be established related to one or more pixels within an array. Such array can be scrutinized such that pixels which meet the one or more predetermined thresholds (e.g., particular gray level, brightness, size, etc.) can be identified. The extraction component 214 can process the identified pixels and determine whether a group of markings indicative of a security mark or configuration thereof is present. The extraction component 214 can analyze the location of the marks in a group relative to each other and relative to other groups of marks in the collection. The size, shape, color, orientation, etc. of the marks can also be analyzed to extract information contained within the one or more security marks or configurations. In addition, the extraction component can analyze the location of any anchor marks relative to each other to insure that a security mark exists in a particular location.

The memory 216 can be employed to store, organize, edit, view, and retrieve one or more algorithms for subsequent use. In one aspect, the extraction component 214 can retrieve one or more algorithms from the memory 216 to determine the information contained within a security mark. In another aspect, the extraction component 214 can determine the appropriate algorithm, methodology, etc. to extract information from one or more security marks and transmit such information to the memory 216 for subsequent use.

The interpretation component 218 can determine the meaning of data extracted from one or more putative security marks by the extraction component 214. Such a determination can be made based on one or more conditions such as the location of the security mark, the recipient upon which the security mark is applied, the location of the system, one or more predetermined conditions, and the like. In addition, a look up table, a database, etc. can be employed by the interpretation component 218 to determine the meaning of data extracted from a security mark. In one example, the security mark is related to the recipient upon which the security mark is applied. For instance, a security mark which corresponds to a data string "5jrwm38f6ho" may have a different meaning when applied to a one hundred dollar bill versus a one hundred euro bill.

In one embodiment, the interpretation component 218 compares information derived from the security mark with other information concerning the recipient. The information concerning the recipient may be stored on memory and/or may be extracted from the recipient. For example, the detection component may detect that the recipient comprises an image of a one hundred dollar bill or this information may be input by an operator of the system. The interpretation component may determine, from the look up table, whether information derived from the security mark properly corresponds to a one hundred dollar bill.

The implementation component 220 may automatically implement a computer implemented process based on information from the interpretation component. For example, if the interpretation component 218 determines that there is no security mark or collection of marks corresponding to a one hundred dollar bill on the recipient, the implementation component 220 may send a signal to an associated device, cause an alarm to sound, generate data indicating that the bill is suspected of being counterfeit, or other process based on the interpretation. For example, when the presence of a particular security mark is detected which is interpreted as indicative of a copyrighted document, the implementation component 220 may signal an associated printer 224 which may prevent copying of the document on the printer.

Figure 6:
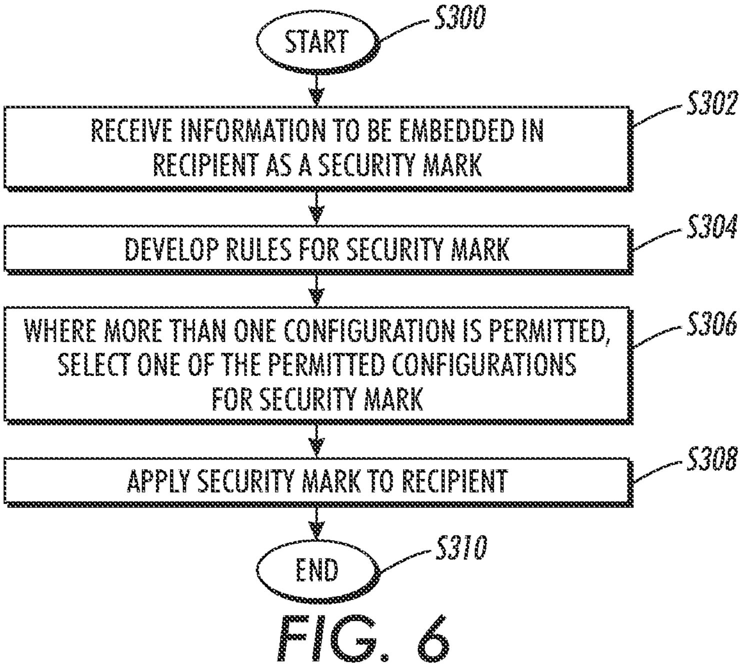
FIG. 6 is a is a flow chart illustrating an exemplary method of applying a security mark.

FIG. 6 illustrates a method of generating a security mark which may be performed using the system illustrated in FIG. 4. The method is described as a series of steps. However, it is to be appreciated that the method may comprise fewer, more, or different steps and that the steps need not be performed in the order illustrated. The method begins at step S300. At step S302, information is received from one or more sources. Such information can contain data pertaining to source, date, time, serial number, sequential code, etc. In one example, the information is a proprietary alphanumeric sequence that is known only to a limited number of parties. At Step S304, security mark rules are developed which enable the security mark to be extracted from a recipient and distinguished (with an acceptable level of reliability) from natural defects. The rules may permit a plurality of configurations for a security mark, based at least in part upon the information received at step S302. In one embodiment, the security mark rules/configurations can be generated utilizing one or more algorithms that can determine the size, shape, color, orientation and location of the simulation marks and groups of marks according to predefined rules. The algorithm may be selected based on the information received in step S302. As will be appreciated, the development of rules (Step S304) may precede, at least in part, the input of information. Optionally, at step S306 where more than one configuration is permitted, one of the permitted configurations is selected based on predetermined selection criteria, including criteria based on characteristics of the image into which it is to be embedded. The characteristics may include, for example, color, shape, size, etc. and locations of suitable areas and/or unsuitable areas in the region 12, 18 of the recipient to which the security mark is to be embedded.

At step S308, the security mark is applied to a recipient. Application of the security mark can be accomplished utilizing substantially any device such as a printing platform, a laser marker, a pin stamp marker, etc. In addition, substantially any methodology such as xerography, printing, image transfer, etc. can be employed to apply the security mark to a recipient, such as paper. Alternatively, step S308 may comprise simply embedding the security mark in a digital image. The method ends at step S310.

Figure 7:
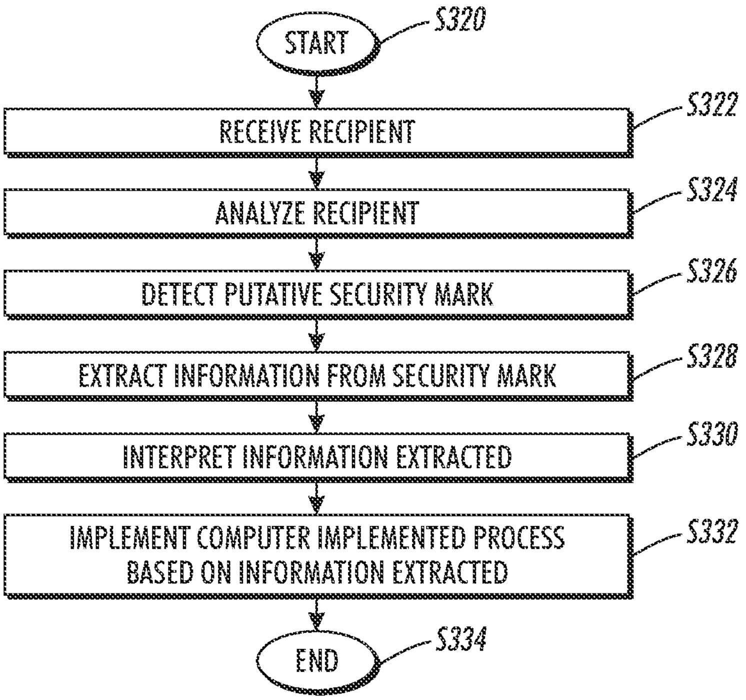
FIG. 7 is a flow chart illustrating an exemplary method of extracting information from a security mark.

FIG. 7 illustrates a detection method, which may occur at some time subsequent to step S308. The method of FIG. 7 may be performed on the recipient marked with the security mark according to the method described above in FIG. 6 or on a document which has a different security mark or no security mark. The method starts at step S320. At step S322, a recipient which may or may not comprise a security mark is received.

At step S324, the recipient is analyzed. This analysis can determine the context wherein a security mark may be employed. For example, the type of recipient, the location of the analysis, the material that comprises the recipient, text and/or images placed on the recipient, etc. can be determined. In one example, the same security mark may have different meanings related to the recipient upon which it is placed.

At Step S326, a putative security mark, where present, may be detected. Detection can be performed, in part, by a number of methods such as those using optical systems, including video systems, and/or human detection. In this manner, the location, size, orientation, etc. of the security mark can be determined. In one embodiment step S326 includes examination of pixels in a region of an image where a security mark, where present, should be located and determining whether any of those pixels singly or in combination have colors and/or grey levels which generally correspond to marks of a security mark.

At Step S328, the putative security mark (e.g., a single simulation mark or a collection of marks which may correspond to a security mark) is extracted to determine the data contained therein. Extraction of the security mark can be accomplished by one or more automated techniques, such as algorithms, formulae, equations, methods, etc. to interpret data represented by a particular security mark. In one example, the security mark includes an MSM or an HMSM configuration wherein data conforms to one or more rules, such as hierarchical rules. As part of the extraction, analysis can be performed to determine the location of the simulation marks relative to each other and the relationship(s) between marks or groups of marks. The size, shape, color, orientation, etc. of the marks can also be analyzed to extract information contained within the one or more configurations. In this step, different configurations of the same security mark are considered to be identical and thus to represent identical information.

At Step S330, the information extracted from the putative security mark is interpreted. In particular, once information has been extracted from the security mark, it is interpreted to determine its meaning. Such interpretation can be contextual, as the same information extracted from various disparate contexts can have different meanings. In one example, the same alphanumeric string extracted from a security mark on a passport can have a different meaning than on a bill of currency. Once data is interpreted, it can be output for further processing. The interpretation step may be implemented by a machine, such as interpretation component 218.

At step S332, a computer implemented process may be implemented based on the interpretation made at step S330. The method ends at step S332.

In one exemplary embodiment, security marks are embedded in paper documents that are to be protected. When the documents are scanned, processed, and sent to a printer, the security mark detectors in the imaging system may recognize the embedded security mark(s) and defeat attempts to copy.

In one embodiment, the rule generating step (step S304) may include defining a set of M ($M=2^N$) marks that mimics natural defects. The set may include marks of different defect types (coffee spots, paper fibers, printing noise and the like), or marks of the same type, but different parameters (sizes, colors, shapes, and the like). Each mark is thus distinguishable from every other mark in the set. Each mark in the set is then assigned a different N-bit binary number. Among the N bits, D bits are used to carry data, and the rest S bits ($0 \le S < N$, $D+S=N$) are used for sequencing the data. The set of marks are stored both at embedding and detection sides.

During the embedding step (step S308), the message to be encoded is first converted to its binary representation. The binary data is then partitioned into pieces, each with a length of D bits. For each piece of data, an ID used for sequencing is attached. For example, the data to be embedded is 010 001 111 101, D=3 and S=2 (N=2+3=5). The data is partitioned into 010, 001, 111, and 101. After attaching ID 00, 01, 10, 11 (binary forms of 0, 1, 2, and 3) to each piece of data, the results are 00 010, 01 001, 10 111, and 11 101. For each piece of data, the mark that represents the data is embedded into the image either within the predefined image area or outside it. To ensure detectability, the marks are placed where the background color are significantly different than the mark color. Thus, some of the marks may be within the predefined image area, while others are outside it.

During detection, the marks are first extracted (Step S328). As marks have different color than the background image, simple thresholding in color may achieve satisfactory results. The marks are then compared to the set of marks that are pre-stored. If a match is found, the binary number associated with the mark is retrieved. The retrieved binary number is divided into two parts, its ID and its data. The data from different marks are assembled to reconstruct the original embedded message. In the example of the last paragraph, the marks corresponding to 00 010, 01 001, 10 111, and 11 101 are extracted, and the binary numbers are retrieved. For 00 010, the data part is 010 and its ID is 00, thus should appear first in the reconstructed message. 01001 has data 001 and ID 01 and should be placed at the second position. 10 111 has an ID of 10 and should appear next. 10 111 is the last in the message. The reconstructed message is 010 001 111 101.

The exemplary embodiment has advantages in that it enables a relatively small number of marks to be unobtrusively disposed in a document and detected with high levels of accuracy using relatively simple and inexpensive detectors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for detecting a security mark comprising a simulation mark or a group of simulation marks which resemble a natural defect, the method comprising:

inputting image data;

processing at least a portion of the image data to identify at least one mark which potentially forms at least a part of a security mark resembling a natural defect;

subjecting the image data to a predetermined set of rules for the security mark, including at least one rule, whereby the security mark, which resembles a natural defect, is distinguishable from the natural defect which it resembles, the rules specifying an orientation and a location of the simulation mark or a group of simulation marks; and where the image data meets the predetermined set of rules, implementing a computer implemented process.

2. The method of claim 1, wherein security mark is in one of a predetermined set of configurations which has been applied to a recipient.

3. The method of claim 2, wherein the applied security mark configuration includes a plurality of simulation marks and wherein the applied security mark configuration obeys at least one rule which defines a spatial relationship between at least a first of the plurality of marks and a second of the plurality of marks.

4. The method of claim 2, wherein the recipient includes an image which is located entirely within a predefined image area and wherein the security mark configuration is applied to the recipient outside the predefined image area.

5. A computer readable non-transitory medium comprising instructions for performing the method of claim 1.

6. The method of claim 1, wherein a set of marks that mimic natural defects is defined and stored.

7. The method of claim 6, wherein the set of marks includes marks of different defect types or marks of the same type, but different parameters of at least one of size, color, and shape, each mark being distinguishable from every other mark in the set.

8. The method of claim 7, wherein each mark in the set of marks is associated with binary data, the detection comprising comparing the at least one mark to the set of stored marks and if a match is found, retrieving the binary data associated with the mark.

9. A system for detection of security marks comprising:

a detection component for generating a signal representative of image data;

an extraction component for extracting from the image data a security mark where present, the security mark comprising at least one simulation mark resembling a natural defect, the security mark obeying at least one rule whereby the security mark is distinguishable from the natural defect which it resembles by the detection system;

an interpretation component for interpreting the extracted security mark; and optionally, an implementation component for implementing a computer implemented process in accordance with the interpretation.

10. The system of claim 9 wherein the applied security mark has a configuration obeying at least one rule whereby the security mark is distinguishable from the natural defect which it resembles, by the system for detection of security marks, with an acceptable level of confidence.

11. The system of claim 9, wherein the security mark is applied to a recipient, and wherein the recipient comprises a tangible medium.

12. The system of claim 9, wherein the security mark is applied to a recipient, and wherein the recipient comprises an image located entirely within a predefined image area of the tangible medium and the applied security mark configuration is located at least partially outside the predefined image area.

13. The system of claim 9, wherein the security mark comprises a plurality of simulation marks.

14. The system of claim 13, wherein the at least one rule defines a spatial relationship between at least first and second simulation marks of the plurality of simulation marks.

15. The system of claim 9, wherein the natural defect resembled is a natural defect which is visually detectable and wherein the applied security mark is indistinguishable from the natural defect resembled to the unaided eye.

16. The system of claim 15, wherein the natural defect resembled is a defect often observed when tangible recipients are observed by the unaided eye.

17. The system of claim 9, wherein the natural defect resembled by the security mark comprises at least one of a stain, a dust particle, an ink spot, a printer defect, a fingerprint, and a paper fiber.

18. The system of claim 9, wherein the simulation mark is distinguishable from the natural defect it resembles by at least one of size, color, shape, repetition of an identifiable feature of the simulation mark, and spatial relationship to another simulation mark.

19. The system of claim 9, wherein the interpretation component interprets the extracted security mark information as representative of at least one of an origin of manufacture, a date, a time, a serial number, and an alphanumeric string.

20. The system of claim 9, wherein the at least one security mark comprises at least one simulation mark which resembles a natural defect, the at least one simulation mark being irregularly shaped, the irregular shape of the irregularly-shaped simulation mark being recognized by the predetermined set of rules.

21. The system of claim 9, wherein an orientation, a shape, and a location of the simulation mark or a group of simulation marks are determined according to predefined rules.

22. The system of claim 9, wherein the security mark comprises a group of simulation marks comprising a plurality of irregularly shaped simulation marks generated utilizing one or more algorithms that determine the size, shape, color, orientation and location of the simulation marks, whereby the shape of the simulation marks is analyzable by the interpretation component to extract information.

23. The system of claim 9, wherein the extraction component employs one or more algorithms to extract information contained within one or more security marks.

24. A method for detecting a security mark comprising:

inputting image data;

processing at least a portion of the image data to identify at least one mark which potentially forms at least a part of a security mark resembling a natural feature;

subjecting the image data to a predetermined set of rules for the security mark, including at least one rule, whereby the security mark is distinguishable from the natural feature which it resembles, the at least one security mark comprising at least one simulation mark which resembles a natural defect, the at least one simulation mark being irregularly shaped, the irregular shape of the irregularly-shaped simulation mark being recognized by the predetermined set of rules; and where the image data meets the predetermined set of rules, implementing a computer implemented process.

* * * * *